United States Patent [19]
Miceli

[11] 3,835,890
[45] Sept. 17, 1974

[54] BUOYANT LIQUID-CONVEYING HOSE
[75] Inventor: Angelo S. Miceli, Detroit, Mich.
[73] Assignee: Uniroyal, Inc., New York, N.Y.
[22] Filed: Mar. 29, 1973
[21] Appl. No.: 346,207

[52] U.S. Cl. ................................. 138/103, 9/8 R
[51] Int. Cl. ............................................. F16l 11/12
[58] Field of Search .......... 138/103, 111, 118, 121; 9/8 R

[56] References Cited
UNITED STATES PATENTS
| | | | |
|---|---|---|---|
| 3,119,415 | 1/1964 | Galloway | 138/111 X |
| 3,489,182 | 1/1970 | Camerom | 138/103 |
| 3,538,955 | 11/1970 | Anderson | 138/103 |

Primary Examiner—Herbert Goldstein
Attorney, Agent, or Firm—Charles A. Blank, Esq.

[57] ABSTRACT

A buoyant liquid-conveying hose which minimizes loss in buoyancy due to physical damage of the buoyancy material and which minimizes any decrease in the volume of the buoyancy material caused by ambient conditions of temperature and external pressure. The hose comprises a hose body and a plurality of rigid buoyant annuluses and a plurality of resilient buoyant spacer annuluses of closed cell expanded plastic material between the rigid annuluses and adherent to the hose body and having lateral surfaces complementary to the surfaces of the rigid annuluses.

6 Claims, 1 Drawing Figure

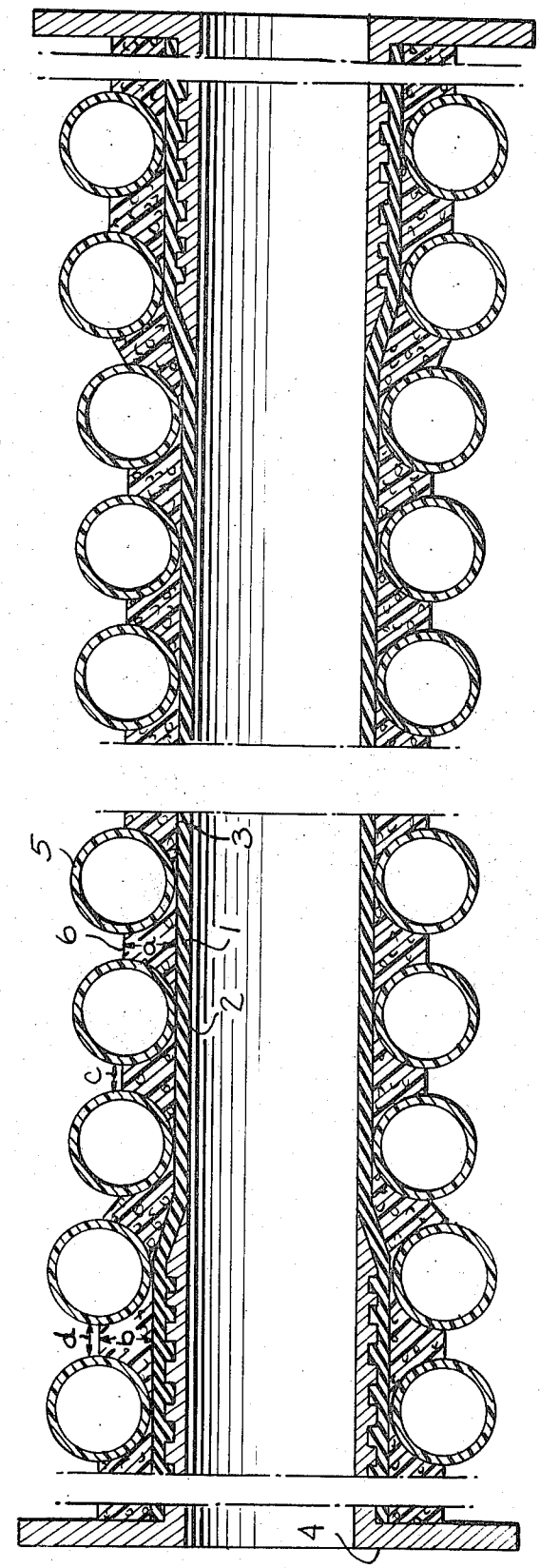

BUOYANT LIQUID-CONVEYING HOSE

This invention relates to buoyant liquid-conveying hose, and more particularly, to such hose suitable for conveying, while floating on water, crude or refined oil products or slurry comprising, for example, particulate solid matter dispersed in water. As used herein, the term "liquid-conveying hose" includes slurry-conveying hose.

Such hose has heretofore been floated by utilizing annular beads of cellular material attached to the hose in sufficient amounts to render the entire assembly buoyant. This approach has the serious shortcoming that cellular materials rigid enough to withstand the compressive stresses to which the assembly may be subjected have proven brittle in service, requiring costly field replacements to be made. Also, protective covers have been used on the cellular floats, which add substantially to the cost of the floats.

Such hose has also previously been rendered buoyant in water by a layer over the hose body of flexible cellular sponge rubber. To protect the cellular material, an exterior thick coating of fabric-reinforced rubber is added to give the assembly good abrasion and impact resistance. This latter type of hose has the disadvantage that with changes in temperature and changes in external pressure, as when the hose may be occasionally dragged below the surface for any reason, irreversible changes in the effective specific gravity of the cellular material occur. The buoyancy of the overall assembly can decrease sufficiently to cause the hose to sink in service.

Another known floatable hose utilizes foam-filled plastic floats made in two parts united to each other at the middle by a slip joint formed on adjacent halves of the float. Intermediate members between the floats are utilized to permit the hose to bend. This structure has the disadvantage of being more complex and costly than is desirable for some applications.

It is an object of the present invention, therefore, to provide a new and improved buoyant liquid-conveying hose which avoids one or more of the above-mentioned disadvantages of prior such hose.

It is another object of the invention to provide a new and improved buoyant liquid-conveying hose which minimizes any loss in buoyancy due to possible physical damage of the buoyancy material.

It is another object of the invention to provide a new and improved buoyant liquid-conveying hose which minimizes loss in buoyancy due to decrease in the effective volume of the buoyancy material caused by ambient conditions of temperature and external pressure.

It is another object of the invention to provide a new and improved liquid-conveying hose of simple and inexpensive construction.

In accordance with the invention, a buoyant liquid-conveying hose comprises a hose body, a plurality of rigid buoyant annuluses external to the hose body and a plurality of resilient buoyant spacer annuluses of closed cell expanded plastic material between the rigid annuluses and adherent to the hose body and having lateral surfaces complementary to the surfaces of the rigid annuluses.

As used herein the term plastic is intended to include materials which are rubber or plastic or both and the like.

Referring now more particularly to the drawing:

The FIGURE is a fragmentary view, in section, of a hose constructed in accordance with the invention.

For a better understanding of the present invention, together with other and further objects thereof, reference is made to the following description, taken in connection with the accompanying drawing, and its scope will be pointed out in the appended claims.

As shown in the drawing, the hose comprises a hose body 1 which may be of any conventional construction and typically includes an oil-resistant lining 2 covered by layers of elastomeric material in which may be incorporated one or more fabric breaker layers and one or more metallic reinforcing layers, such as layers of helically wound wire. The hose body includes a suitable water-impermeable cover 3 comprising, for example, a first layer of styrene-butadiene copolymer in which are embedded two plies of rubber skim-coated tire cord laid at opposite bias angles and an outer layer of weather-resistant rubber, for example, neoprene. Curing of the hose body and its water-impermeable cover may be effected in a conventional manner. The hose has suitable metal couplings 4 at its ends.

A plurality of rigid buoyant annuluses 5, preferably of toroidal shape and of rigid plastic material, for example, polyvinyl chloride pipe of circular cross section, may be prepared by heating the pipe in a pre-heating oven at, for example, 325°F. for sufficient time to make it easily formable. After pre-heating, the pipe may be shaped around the hose body and the mating ends of the pipe may be cemented together with a suitable connecting plug cemented therein.

A plurality of resilient buoyant spacer annuluses 6 of closed cell expanded plastic material, preferably sponge rubber, between the rigid annuluses 5 and adherent to the hose body and having lateral surfaces complementary to the surfaces of the rigid annuluses 5 are utilized between the rigid annuluses 5. The sponge rubber annuluses 6 preferably are cemented to the hose body. The cross-sectional width of each of the spacer annuluses 6 taken radially of the hose preferably is approximately one-half the cross-sectional width of the rigid annuluses 5 adjacent thereto to protect the spacer annuluses from abrasion and impacts.

The hose is rendered buoyant by the net buoyancy of the rigid annuluses and sponge rubber annuluses. To float the hose without the ends sinking to a lower level than the remainder of the hose, annuluses of larger diameter may be used at the bell or outer ends of th hose and the rigid annuluses at the outer ends may be spaced more closely together than those in the midsection of the hose. Alternatively, some rigid annuluses 5 and sponge rubber annuluses 6 may be omitted from the midsection of the hose to float the hose without the ends sinking to a lower level than the remainder of the hose.

In a specific example of buoyant hose constructed in accordance with the invention, the following dimensions may be utilized:

| | |
|---|---|
| Length of Hose | 30 feet |
| Inner Diameter of Hose | 24 inches |
| Outer Diameter of Hose | 26.7 inches |
| Outer Diameter of Hose at Bell Ends of Hose | 29.7 inches |
| Outer Diameter of Rigid Polyvinyl Chloride Annuluses at Center Region of Hose | 40.0 inches |

-Continued

| | |
|---|---|
| Outer Diameter of Rigid Annuluses at Bell Ends of Hose | 43.0 inches |
| Wall Thickness of Rigid Annuluses | 0.20 inches |
| Cross Sectional Width (a) of Sponge Annuluses at Center Region of Hose | 3.3 inches |
| Number of Rigid Annuluses at Center Region of Hose | 26 |
| Number of Rigid Annuluses at Bell Ends of Hose | 5 at each end |
| Cross-Sectional Width (b) of Sponge Annuluses at Bell Ends of Hose | 3.3 inches |
| Spacing (c) between Rigid Annuluses at Center Region of Hose | 1.5 inches |
| Spacing (d) between Rigid Annuluses at Bell Ends of Hose | 1.5 inches |
| Specify Gravity of Sponge Rubber Annuluses | 11.8 lbs per cubic foot. |

It should be understood that buoyant hose constructed in accordance with the invention may have a positive buoyancy, when full of water, causing the hose to float on the surface of the sea or the like. Also, the buoyant hose may be constructed in accordance with the invention to have a neutral buoyancy, when full of water, at a desired submerged depth, causing the hose to be suspended at the desired submerged depth. A hose having a neutral buoyancy, when full of water, at a desired submerged depth is a buoyant hose as the term is used in the specification and claims.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A buoyant liquid-conveying hose comprising a hose body, a plurality of rigid buoyant annuluses external to said hose body and a plurality of resilient buoyant spacer annuluses of closed-cell expanded plastic material between said rigid annuluses and adherent to said hose body and having lateral surfaces complementary to the surfaces of said rigid annuluses.

2. A hose in accordance with claim 1 in which said rigid annuluses are each of toroidal shape.

3. A hose in accordance with claim 1 in which said rigid annuluses are hollow annuluses of rigid plastic material.

4. A hose in accordance with claim 3 in which said plastic material is polyvinyl chloride.

5. A hose in accordance with claim 1 in which said spacer annuluses are of sponge rubber.

6. A hose in accordance with claim 1 in which the cross-sectional width of each of said spacer annuluses taken radially of the hose is approximately one-half of the cross-sectional width of said rigid annuluses adjacent thereto.

* * * * *